Sept. 18, 1934.  C. I. JUSTHEIM ET AL  1,973,713
FUELING SYSTEM
Filed Nov. 18, 1932   2 Sheets-Sheet 1
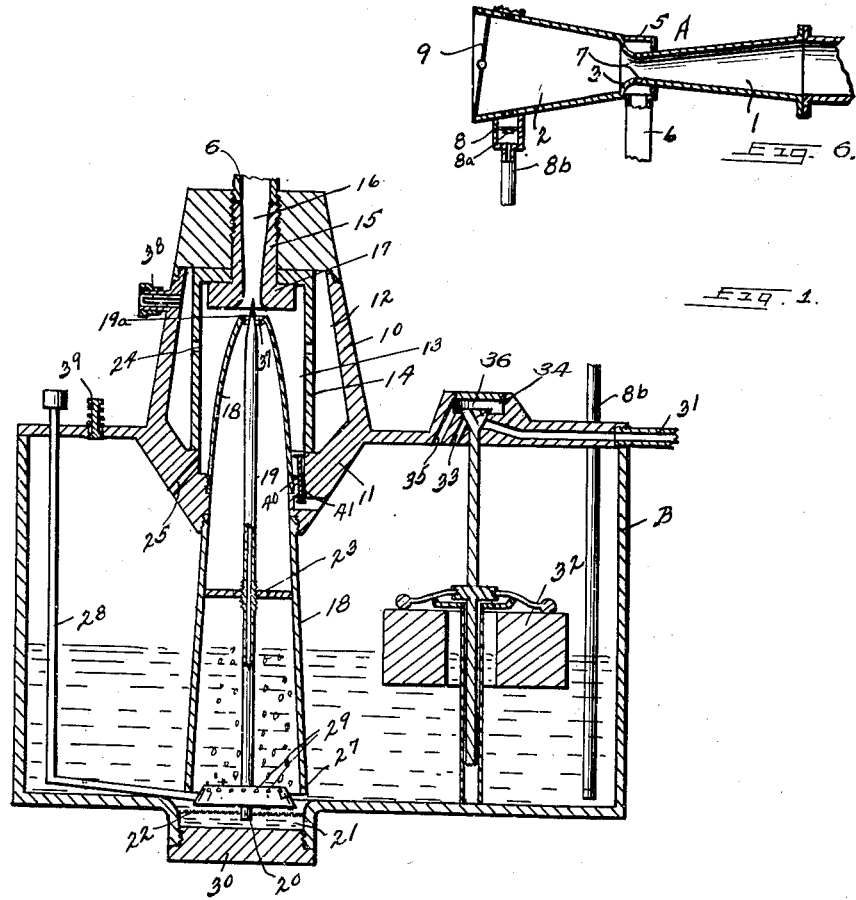
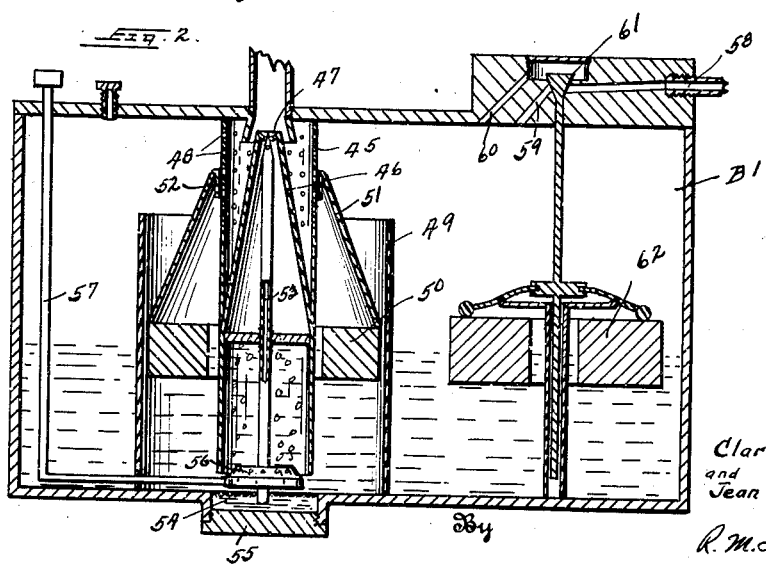
Inventor
Clarence I. Justheim
and
Jean C. Stafford
By
R. M. Thomas
Attorney

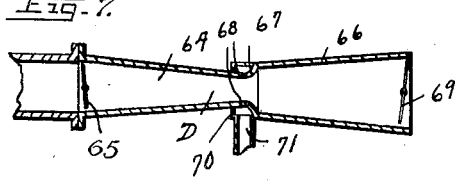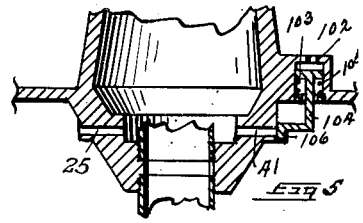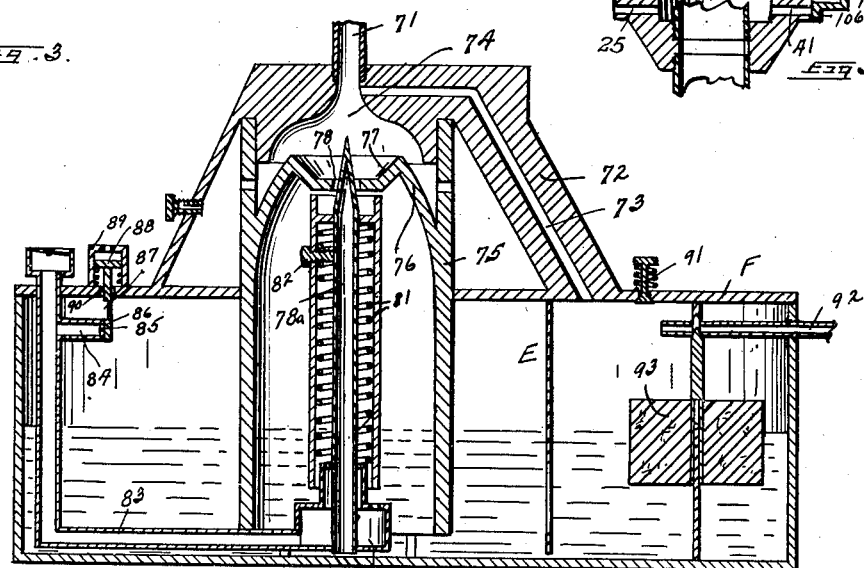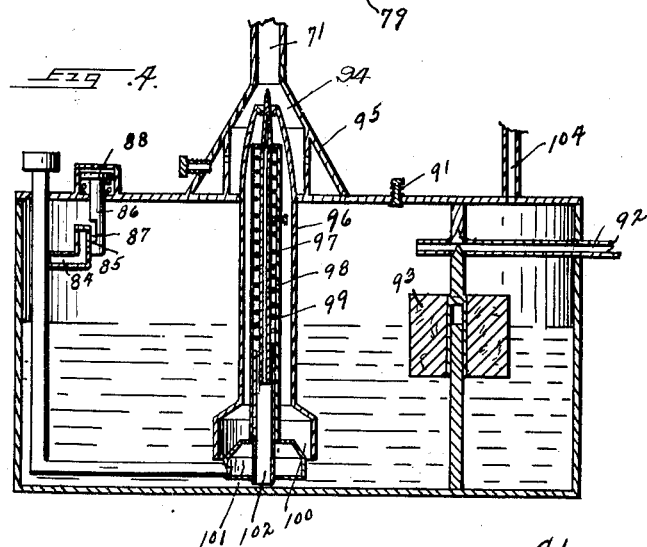

Patented Sept. 18, 1934

1,973,713

UNITED STATES PATENT OFFICE 1,973,713

FUELING SYSTEM

Clarence I. Justheim, Salt Lake City, Utah, and Jean C. Stafford, Dayton, Ohio; said Stafford assignor to said Justheim Application November 18, 1932, Serial No. 643,184

9 Claims. (Cl. 261—72)

Our invention relates to automobiles and has for its object to provide a new and efficient fueling system for internal combustion engines which system eliminates the carburetor, pump, or vacuum tank and accomplishes the same results with the use of a mixing chamber suction device and an auxiliary tank.

A still further object is to provide an atmospheric balance in the auxiliary tank which will draw the fuel from the main tank and mix it with the proper proportions of air as to completely carburet the fuel before it enters the suction device and when it enters the suction device it is further mixed with air to provide greater mileage per gallon of fuel.

A still further object is to provide an auxiliary tank which, when connected with a proper type of suction device mounted at the intake manifold, will draw the fuel from the main supply tank and mix it with air.

A still further object is to provide a mixing tank to be used in conjunction with a suction device with the mixing tank to provide means for an atmospheric balance in said tank so that when the fuel is drawn therefrom it is a combustible mixture.

A still further object is to provide means to build up sufficient suction in the auxiliary tank to draw fuel from the main tank, with means to by-pass this suction, should it become too great to allow the system to work in balanced condition.

These objects we accomplish with the device illustrated in the accompanying drawings in which similar numerals and letters of reference indicate like parts throughout the several views and as described in the specification forming a part of this application and pointed out in the appended claims.

In the drawings in which we have shown our device

Figure 1 is a diagrammatic section of the device shown connected with the suction device by arrow.

Figure 2 is a section of a modified form of tank.

Figure 3 is a diagrammatic sectional view of a suction device and auxiliary tank showing means to control the suction within the tank.

Figure 4 is a modified form of tank from that shown in Figure 3.

Figure 5 is a sectional view of one portion of the cover of the tank shown in Figure 1, showing a modified form of controlling the suction built up in the tank.

Figure 6 is a sectional view of the suction device used with Figure 1 to draw the fuel to the internal combustion engine.

Figure 7 is a sectional view of the suction device used with Figure 3.

In the drawings we have shown the suction device as A, and said device is formed of a frusto-conical chamber 1, joined to a reversed frusto-conical chamber 2, by a curved joint 3, with the end of the chamber 1 flanged and secured to the intake manifold of the engine. Surrounding the juncture of the two chambers, we provide an annular chamber 5, which is connected with the auxiliary tank B by a line 6. Ports 7 are drilled through the wall of the chamber 1 at the point of greatest constriction where the conical wall is tangential to the curved wall and said ports are bored through at an angle sloping from the outer side of the wall to the inner side and toward the end where the chamber 1 is joined to the intake manifold. An annular chamber 8 is formed around the chamber 2, said chamber 8 having a partition therein, said partition carrying ports therethrough controlled by valves 8a and a lead line 8b connects the outer portion of the chamber 8 with direct fuel. A valve 9 controls the suction through the suction device A and is mounted for manual control in the open end of the chamber 2.

The auxiliary tank B is made with the cover provided with a large boss 10 formed on the top side of the cover therefor, and a smaller boss 11 formed concentric therewith on the under side of the cover. The boss 10 is provided with an annular chamber 12 therein and within the chamber a cylindrical partition 14 forms a chamber 13, within the chamber 12, but separated therefrom. The partition 14 is provided with a flange on the end by which it is secured to the inner end of the chamber 12 by securing the cylinder to the end through inserting a bolt 15 therethrough. The bolt 15 is formed with a tapered upper portion 16 and curved open lower end 17, with the end of the portion 16 in open connection with the line 6. We then secure tapered cylinder 18 in the inner chamber 13 and the lower end of the cylinder 18 is extended through the bottom of the boss 11 to near the bottom of the tank B. The cylinder 18 is concentric with the bore of the bolt 15 and within the cylinder we provide a hollow tube 19 having a port 19a in the top end thereof and with the bottom end 20 opening into a sump 21, which sump is formed in the bottom of the tank B. A screen is carried in the sump to screen all gas entering the sump from the tank and to provide clean fuel for the tube 18. An adjustment nut 23 is carried mounted within the power portion of the cylinder 18 to provide for vertical adjustment of the tube 19.

Ports 24 are bored through the wall of the cylinder partition 14 into the chamber 13 from the chamber 12 and a slanting port 25 is bored through the boss 11 into the chamber 13 from the interior of the tank B. An aerator 27 is placed in the tank B under the cylinder 17 to aerate the fuel within the cylinder 17. The aerator has a lead in line 28 from the top of the tank to provide air into the aerator, said air to pass down the line 28 into the aerator and out through ports 29 in the top of the aerator. A plug 30 is screwed into the bottom end of the sump to close it. A fuel inlet line 31 leads from the main supply tank, not shown, into the cover of the tank B and a float 32 controls the level of fuel in the tank B by closing off the inlet port 31 by the valve 34. A port 35 aids in closing the valve 34 by allowing the pressure in the tank B to pass through the port 35 into the chamber 36 above the valve head and press down upon the head of the valve 34.

The top end of the cylinder 18 is beveled inwardly at 37 to aid in suction through the cylinder and draw the fuel from the port 19a in the tube 19. An atmospheric balance port is formed into the chamber 12 by introducing an atmospheric valve 38 therein, said valve being adjustable as to the amount of air allowed to enter the chamber 12. In the chamber 13 we also provide a needle valve 40 controlled by the suction in said chamber, the suction of the chamber when increased draws the valve upwardly, closing the head in the port 41, thereby closing this suction.

In the form of tank shown in Figure 2, there is a cylinder 45 mounted therein, said cylinder carrying a tapered frusto-conical inner cone 46 therein, with the top end of the cone tapered inwardly at 47, to aid in drawing fuel through the central tube 53 and to draw fuel vapors from the chamber within the cone and cylinder 45. Ports 48 are bored through side walls of the cylinder 45 and said ports are opened or closed by the fuel level in the tank B1. A cylinder 49 is carried in the tank, concentric with and surrounding the cylinder 45 with a port from the tank into the bottom of the cylinder 49. Within the cylinder 49 a float 50 is carried, the float 50 carrying a cone 51 therein, said cone having the top end flanged downwarly at 52 to provide a closure valve for the ports 48. As the fuel raises or falls in the cylinder the vapors are drawn through the lower ports from within the cone 51 and the level of the fuel within the cone is raised, thereby raising the level of fuel in the cylinder 45. As the cone lowers, the atmospheric pressure in the tank B is allowed to enter the cylinder 45 through the upper ports 48, thereby changing the suction through the lead line from the fuel suction device and through the cone 46.

Centrally in the cylinder 45 concentric with the cone 46 we provide a tube 53 leading down into a sump 54 in the bottom of the tank B1 and the bottom of the sump is closed by a plug 55. Over the sump and under the cylinder 45 and cone 46, we provide an aerator 56 with the interior of the aerator connected with the atmosphere by a lead in line 57.

A lead in line 58 connects the tank B with a source of fuel supply, either the main supply tank or with a pump, or vacuum tank. The suction through the tank B1 provides ample suction to draw fuel from the main supply tank, but if desired the tank may be connected with gravity feed or any of the other well known systems of drawing fuel from the main supply tank. A port 59 in the top of the tank B1 is opened or closed by a valve 61 and the valve is controlled by the level of fuel in the tank, by the float 62. A port 60 allows the atmospheric pressure in the tank B1 to enter a chamber over the head of the valve 61 and aid in closing the valve.

In the device shown in Figure 3 the suction device D is formed similar to that shown in Figure 1 with a frustro-conical chamber 64 joined to a similar shaped chamber 66 by a curved wall 67 with the chamber 66 reversed as to the chamber 64. A butterfly valve 65 controls the suction through the device and a butterfly valve 69 controls the air allowed to enter the device through the chamber 66. Surrounding the curved wall joining the two chambers we provide an annular chamber 70 to which a lead line 71 is connected the said line 71 being joined to the auxiliary tank E. Ports 68 are bored through the juncture of the curved wall 67 through the tangential connection of the curved wall to the chamber 64. The auxiliary tank E is provided with a cover F and said cover F has a boss 72 formed thereon with a conical bore therein making a conical chamber and within the chamber a cylindrical member 75 is carried. A port 73 connects the interior of the chamber within the tank E with the open bore of the pipe chamber 74, into which chamber 74 the lead line or pipe 71 is connected. The member 75 is provided with a conical casting forming a cone 76 therein with the top end of the cone chamfered inwardly or beveled at 77 with the bottom flat and perforated to form a port 78 therethrough. Through this port a needle valve and fuel jet 78a is passed with the top end bored to allow fuel to pass therethrough and with the top end also tapered to make the needle end thereon the lower portion of the valve passing down through the vaporizer 79.

The vaporizer 79 is connected with the atmosphere by a line 83 and an extension 84 is formed on the line 83 above the fuel level of the tank E with a port 85 in the end of the extension 84. This valve is closed by a sliding valve 85, said valve being operated by the suction created in the tank by the port 73. This suction operates on a piston 88 carried in a cylindrical boss 89 with the stem 86 of the valve connected with the piston 88 and through a port 90 larger in diameter than the stem 86. As the suction in the tank increases a spring under the piston 88 is compressed and the piston is drawn down opening a port 87 in the side of the stem 86 to the port 85, allowing the suction in the tank to be partially balanced by incoming air through the line 83 and extension 84.

Surrounding the needle valve 78a we provide a cylindrical member carrying a spring 81 therein, said spring normally holding the needle valve in opened position, but allowing the needle valve to vary up and down by the suction through the device. A set screw 82 holds the cylindrical member and the needle valve in constant position relative to each other.

An atmospheric pressure valve 91 is provided through the cover F to automatically allow air pressure from the atmosphere to enter the tank E from the atmosphere surrounding the tank when the suction within the tank demands such pressure. The usual float 93 controls the flow of fuel from the source of fuel supply (not shown) through the line 92.

In the modified form shown in Figure 4 the cover of the tank has a conical boss formed thereon which has a port 95 therethrough leading into the upper end thereof from the interior of the tank to create required suction in the tank and a conical chamber 94 is formed in the boss within which the top end of a tube 96 is carried, the bottom end of the tube being in the fuel at the bottom of the tank. Within the tube a tubular needle valve 97 is carried with the top end perforated and with the top end tapered into a needle where it is passed out through the tapered perforated end of the cone 96. Surrounding the valve 97 we provide a cylindrical member 98 with a spring 99 carried therein pressing on a tube 102 in the bottom of the tank, said tube being open to the fuel in the tank and adapted to allow fuel to pass therethrough into the valve 97. An aerator 101 supplies air into the bottom of the cone 96. This aerator is provided with the air suction control device like that shown in Figure 3. The usual float and inlet pipes are also shown as in Figure 3. A lead line 71 connects the space above the fuel with an annular chamber surrounding the suction device similar to the manner shown in Figure 1.

In Figure 5, we have shown another method of controlling the suction in the tank shown in Figure 1, by controlling the port 41 by a flat valve 106 operating over the open end of the said port. This valve is operated by the suction built up in the tank, said suction drawing a piston 103 down in a chamber 102, drawing the connecting stem 104 down and closing the port 41 by the suction within the tank. A spring 105 normally holds the port 41 open by acting on the bottom side of the piston 103.

The operation of the device is as follows:

When the motor is rotated the suction thus created draws air through the suction device A and through the line 6 from the chamber 13 and from the cone 18 in the tank B. This draws fuel through the tube 19 out of the port 19a and through the cone 16 into the line 6 to the suction device A. Also fuel vapors from the cylinder 18 are drawn through the end 37 of the cone 18 into the cone 16 and the line 6 and thence to the suction device.

Air to vaporize the fuel in the cylinder 18 is drawn through the line 28 and through the aerator 27 through the ports 29 to bubble up through the fuel within the cone and cylinder and vaporize this fuel. An atmospheric balance is set up in the tank B and the suction line through the atmospheric ports 39 in the tank B and the valve 38 in the chamber 12, thereby making the device operative.

Having thus described our invention we desire to secure by Letters Patent and claim:—

1. In a device of the class described the combination of a cone carried in a tank; means to control the flow of air thereinto; a fuel line leading from said tank and cone to the intake manifold of an internal combustion engine; means to aerate the fuel in the cone; means to break the suction through the aerator; means to control the flow of fuel into the tank; and a jet mounted through the cone to direct raw fuel into the fuel line from the top of the cone.

2. In a device of the class described the combination of a suction device mounted to the intake manifold of an internal combustion engine; a lead line therefrom; an auxiliary tank connected with said lead line and with the main supply tank of the engine; a by pass from the lead line into the space above the fuel in the auxiliary tank; a spring controlled jet to introduce raw fuel into the lead line; a cylinder surrounding said jet to direct fuel vapors into said lead line; means to aerate the fuel in the cylinder; means by the involved pressure and suction in the cylinder to move the jet; and means to balance the suction and pressure in the tank.

3. In a device of the class described the combination of a suction device mounted to the intake manifold of an internal combustion engine; an auxiliary tank mounted near said suction device; an annular chamber surrounding one portion of said suction device; ports leading from the annular chamber into the interior of said suction device; a cylinder mounted in said tank, to which the annular chamber is connected; a partitioned annular chamber mounted on said suction device; valves to control ports through the partition; ports leading from the inner portion of the partitioned annular chamber into the suction device; and a lead line from the outer portion of the partitioned annular chamber into the fuel in said tank.

4. In a device of the class described the combination of a suction device mounted to the intake manifold of an internal combustion engine; an auxiliary tank mounted near said suction device; an annular chamber surrounding one portion of said suction device; ports leading from the annular chamber into the interior of said suction device; a cylinder mounted in said tank to which the annular chamber is connected; a partitioned annular chamber mounted on said suction device; valves to control ports through the partition; ports leading from the inner portion of the partitioned annular chamber into the suction device; a lead line from the outer portion of the partitioned annular chamber into the fuel in said tank; and means to balance the pressure and suction in the tank.

5. In a fueling system the combination of a tank to be used in combination with the main supply tank and a suction device mounted at the intake manifold of an engine; a chamber carried in said tank; means to aerate the fuel in the chamber; means to draw the aerated fuel from the chamber to the suction device; an annular ring surrounding one portion of said suction device; a partition in said annular ring; ports leading from the inner portion of said annular ring into said device; means to control the suction through ports in the partition; and a lead line from the outer portion of said annular ring into the fuel in the tank.

6. In a fueling system the combination of a tank to be used in combination with the main supply tank and a suction device mounted at the intake manifold of an engine; a chamber carried in said tank; means to aerate the fuel in the chamber; means to draw the aerated fuel from the chamber to the suction device; an annular ring surrounding one portion of said suction device; a partition in said annular ring; ports leading from the inner portion of said annular ring into said suction device; means to control the suction through ports in the partition; means to control the level of fuel in said tank; and a lead line from the outer portion of said annular ring into the fuel in the tank.

7. In a fueling system the combination of a tank to be used in combination with the main supply tank and a suction device mounted to the intake manifold of an engine; a chamber carried in said tank; means to aerate the fuel in the chamber; means to draw the aerated fuel from the chamber to the suction device; an annular ring surrounding one portion of said suction device; a partition in said annular ring; ports leading from the inner portion of said annular ring into said suction device; means to control the suction through ports in the partition; a lead line from the outer portion of said annular ring into the fuel in said tank; another annular ring surrounding said suction device and a lead line from said annular ring into the tank above the level of fuel therein.

8. In a fueling system the combination of a tank to be used in combination with the main supply tank and a suction device mounted to the intake manifold of an engine; a chamber carried in said tank; means to aerate the fuel in the chamber; means to draw the aerated fuel from the chamber to the suction device; an annular ring surrounding one portion of said suction device; a partition in said annular ring; ports leading from the inner portion of said annular ring into said suction device; means to control the suction through ports in the partition; a lead line from the outer portion of said annular ring into the fuel tank and a lead line from said annular ring into the tank above the level of fuel therein.

9. In a device of the class described, the combination of a suction device mounted to the intake manifold of the internal combustion engine; a fuel supply tank in open connection with said suction device; means to aerate fuel in said tank; and a high speed jet leading into the connection between the suction device and tank to direct raw fuel into the suction device by the action of the aerated fuel passing thereby and therearound.

CLARENCE I. JUSTHEIM.
J. C. STAFFORD.